(12) United States Patent
Hashemi et al.

(10) Patent No.: US 12,143,830 B2
(45) Date of Patent: Nov. 12, 2024

(54) PLANNING AND DEPLOYING SERVICE ELEMENTS OF A NETWORK SERVICE ACROSS TRANSPORT AND CORE NETWORK SEGMENTS

(71) Applicant: AT&T Intellectual Property I, L.P., Atlanta, GA (US)

(72) Inventors: Seyed Hashemi, Johns Creek, GA (US); Shahriar Ziari, Norcross, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 345 days.

(21) Appl. No.: 17/532,544

(22) Filed: Nov. 22, 2021

(65) Prior Publication Data

US 2023/0164579 A1    May 25, 2023

(51) Int. Cl.
| | |
|---|---|
| *H04W 16/18* | (2009.01) |
| *H04L 9/40* | (2022.01) |
| *H04L 12/28* | (2006.01) |
| *H04L 12/46* | (2006.01) |
| *H04L 41/0895* | (2022.01) |
| *H04L 41/12* | (2022.01) |
| *H04L 41/5054* | (2022.01) |
| *H04W 4/06* | (2009.01) |
| *H04W 12/03* | (2021.01) |
| *H04W 76/12* | (2018.01) |
| *H04W 76/40* | (2018.01) |
| *H04W 88/08* | (2009.01) |

(52) U.S. Cl.
CPC ............. *H04W 16/18* (2013.01); *H04W 4/06* (2013.01); *H04W 88/08* (2013.01)

(58) Field of Classification Search
CPC ........ H04W 16/18; H04W 4/06; H04W 88/08
USPC .......................................................... 370/254
See application file for complete search history.

(56) References Cited

U.S. PATENT DOCUMENTS

| | | | | |
|---|---|---|---|---|
| 2015/0098385 A1* | 4/2015 | Navalekar | ............ | H04L 67/568 |
| | | | | 370/312 |
| 2018/0123950 A1* | 5/2018 | Garg | ....................... | H04L 47/22 |
| 2018/0332441 A1* | 11/2018 | Shaw | .................... | H04L 63/105 |
| 2020/0196378 A1* | 6/2020 | Cao | ........................ | H04W 16/18 |
| 2020/0329347 A1* | 10/2020 | Prasad | .................. | H04W 88/16 |
| 2022/0417794 A1* | 12/2022 | Bogineni | .......... | H04W 28/0967 |
| 2023/0037031 A1* | 2/2023 | Wang | ..................... | H04L 67/60 |

* cited by examiner

*Primary Examiner* — Xuan Lu

(74) *Attorney, Agent, or Firm* — Guntin & Gust, PLC; Mark Wilinski

(57) ABSTRACT

The technologies described herein are generally directed to, in response to feature activation at an access point, planning and deploying service elements of a network service across transport and core network segments in a fifth generation (5G) network or other next generation networks. For example, a method described herein can include receiving a request to implement a network service in a network that includes access point equipment connected via a transport segment to a core network segment. The method can further include, based on the request, selecting deployment locations in the network for service elements to enable the network service, with an element of the service elements being selected to be deployed at a deployment location. Further, the method can include deploying the service element at the selected deployment location.

20 Claims, 10 Drawing Sheets

PLANNING AND DEPLOYING SERVICE ELEMENTS OF A NETWORK SERVICE ACROSS TRANSPORT AND CORE NETWORK SEGMENTS

TECHNICAL FIELD

The subject application is related to different approaches to handling network services in networked computer systems and, for example, to the planning and deploying of network service elements across network segments.

BACKGROUND

As network implementations have continued to increase in size and diversity, network services have increased in complexity. For some network services, facilitating delivery of the service can entail the broad deployment of service elements across disparate network segments, e.g., ranging from elements on the edge of access networks to core equipment of the network. For each element, aspects of planning, provisioning, inventory, and activation can impact the time frame of service implementation.

Problems can occur when the pace of dynamic changes to network elements conflicts with the timing and complexity of the implementation of network services.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
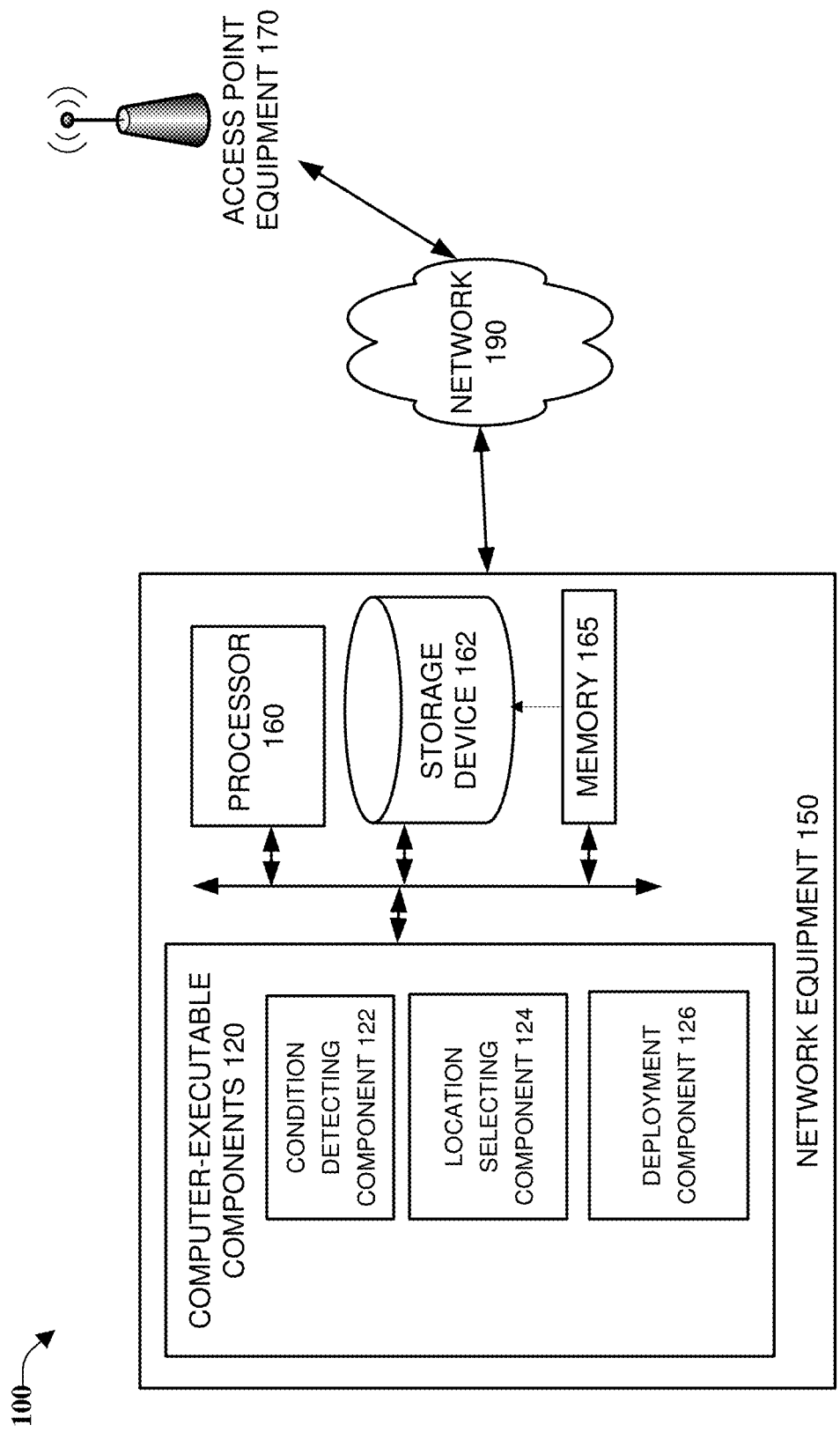
FIG. 1 is an architecture diagram of an example system that can facilitate, in response to feature activation at an access point, planning and deploying service elements of a network service across transport and core network segments, in accordance with one or more embodiments.

Generally speaking, one or more embodiments can facilitate, in response to feature activation at an access point, planning and deploying service elements of a network service across transport and core network segments. In addition, one or more embodiments described herein can be directed towards a multi-connectivity framework that supports the operation of new radio (NR, sometimes referred to as 5G). As will be understood, one or more embodiments can allow an integration of user devices with network assistance, by supporting control and mobility functionality on cellular links (e.g., long term evolution (LTE) or NR). One or more embodiments can provide benefits including, system robustness, reduced overhead, and global resource management, while facilitating direct communication links via a NR sidelink.

It should be understood that any of the examples and terms used herein are non-limiting. For instance, while examples are generally directed to non-standalone operation where the NR backhaul links are operating on millimeter wave (mmWave) bands and the control plane links are operating on sub-6 GHz LTE bands, it should be understood that it is straightforward to extend the technology described herein to scenarios in which the sub-6 GHz anchor carrier providing control plane functionality could also be based on NR. As such, any of the examples herein are non-limiting examples, any of the embodiments, aspects, concepts, structures, functionalities or examples described herein are non-limiting, and the technology may be used in various ways that provide benefits and advantages in radio communications in general.

In some embodiments the non-limiting terms "signal propagation equipment" or simply "propagation equipment," "radio network node" or simply "network node," "radio network device," "network device," and access elements are used herein. These terms may be used interchangeably, and refer to any type of network node that can serve user equipment and/or be connected to other network node or network element or any radio node from where user equipment can receive a signal. Examples of radio network node include, but are not limited to, base stations (BS), multi-standard radio (MSR) nodes such as MSR BS, gNodeB, eNode B, network controllers, radio network controllers (RNC), base station controllers (BSC), relay, donor node controlling relay, base transceiver stations (BTS), access points (AP), transmission points, transmission nodes, remote radio units (RRU) (also termed radio units herein), remote ratio heads (RRH), and nodes in distributed antenna system (DAS). Additional types of nodes are also discussed with embodiments below, e.g., donor node equipment and relay node equipment, an example use of these being in a network with an integrated access backhaul network topology.

In some embodiments, the non-limiting term user equipment (UE) is used. This term can refer to any type of wireless device that can communicate with a radio network node in a cellular or mobile communication system. Examples of UEs include, but are not limited to, a target device, device to device (D2D) user equipment, machine type user equipment, user equipment capable of machine to machine (M2M) communication, PDAs, tablets, mobile terminals, smart phones, laptop embedded equipped (LEE), laptop mounted equipment (LME), USB dongles, and other equipment that can have similar connectivity. Example UEs are described further with FIGS. 9 and 10 below. Some embodiments are described in particular for 5G new radio systems. The embodiments are however applicable to any radio access technology (RAT) or multi-RAT system where the UEs operate using multiple carriers, e.g., LTE.

The computer processing systems, computer-implemented methods, apparatus and/or computer program products described herein employ hardware and/or software to solve problems that are highly technical in nature (e.g., planning and deploying network services across a complicated and diverse network), that are not abstract and cannot be performed as a set of mental acts by a human. For example, a human, or even a plurality of humans, cannot efficiently evaluate a multitude of deployment locations in a small period of time, with the same level of accuracy and/or efficiency as the various embodiments described herein.

Aspects of the subject disclosure will now be described more fully hereinafter with reference to the accompanying drawings in which example components, graphs and selected operations are shown. In the following description, for purposes of explanation, numerous specific details are set forth in order to provide a thorough understanding of the various embodiments. For example, some embodiments described can facilitate, in response to feature activation at an access point, planning and deploying service elements of a network service across transport and core network segments. Different examples that describe these aspects are included with the description of FIGS. 1-10 below. It should be noted that the subject disclosure may be embodied in many different forms and should not be construed as limited to this example or other examples set forth herein.

FIG. 1 is an architecture diagram of an example system 100 that can facilitate, in response to feature activation at an access point, planning and deploying service elements of a network service across transport and core network segments, in accordance with one or more embodiments. For purposes of brevity, description of like elements and/or processes employed in other embodiments is omitted. It should be noted that, although many examples herein discuss particular types of network services (e.g., multimedia delivery and control plane establishment/maintenance) embodiments described and suggested by the present disclosure are not limited by these examples. One having skill in the relevant art(s), given the description herein, appreciate that many types of network services that span transport and core segments of a network, can be implemented based on the present disclosure.

As depicted, system 100 can include network equipment 150 communicatively coupled to access point equipment 170 via network 190. In some examples, in response to access point equipment 170 having a feature activated, network equipment 150 can plan and deploy service elements of a network service across transport and core network segments, e.g., as described with FIGS. 3-5 below.

Network equipment 150, in the example depicted, includes computer executable components 120, processor 160, storage device 162, and memory 165. Computer executable components 120 can include condition detecting component 122, location selecting component 124, deployment component 126, and other components that can improve the operation of system 100 as described or suggested by different embodiments described herein.

Further to the above, it should be appreciated that these components, as well as aspects of the embodiments of the subject disclosure depicted in this figure and various figures disclosed herein, are for illustration only, and as such, the architecture of such embodiments are not limited to the systems, devices, and/or components depicted therein. For example, in some embodiments, network equipment 150 can further comprise various computer and/or computing-based elements described herein with reference to mobile handset 900 of FIG. 9, and operating environment 1000 of FIG. 10. For example, one or more of the different functions of network equipment can be divided among various equipment, including, but not limited to, including equipment at a central node global control located on the core Network, e.g., mobile edge computing (MEC), self-organized networks (SON), or RAN intelligent controller (RIC) network equipment.

In some embodiments, memory 165 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 165 are described below with reference to system memory 1006 and FIG. 10. Such examples of memory 165 can be employed to implement any embodiments of the subject disclosure.

According to multiple embodiments, storage device 162 can include, but is not limited to, RAM, ROM, EEPROM, flash memory or other memory technology, solid state drive (SSD) or other solid-state storage technology, Compact Disk Read Only Memory (CD ROM), digital video disk (DVD), blu-ray disk, or other optical disk storage, magnetic cassettes, magnetic tape, magnetic disk storage or other magnetic storage devices, or any other medium which can be used to store the desired information and which can be accessed by the computer.

According to multiple embodiments, processor 160 can comprise one or more processors and/or electronic circuitry that can implement one or more computer and/or machine readable, writable, and/or executable components and/or instructions that can be stored on memory 165. For example, processor 160 can perform various operations that can be specified by such computer and/or machine readable, writable, and/or executable components and/or instructions including, but not limited to, logic, control, input/output (I/O), arithmetic, and/or the like. In some embodiments, processor 160 can comprise one or more components including, but not limited to, a central processing unit, a multi-core processor, a microprocessor, dual microprocessors, a microcontroller, a system on a chip (SOC), an array processor, a vector processor, and other types of processors. Further examples of processor 160 are described below with reference to processing unit 1004 of FIG. 10. Such examples of processor 160 can be employed to implement any embodiments of the subject disclosure.

In one or more embodiments, computer executable components 120 can be used in connection with implementing one or more of the systems, devices, components, and/or computer-implemented operations shown and described in connection with FIG. 1 or other figures disclosed herein. For example, in one or more embodiments, computer executable components 120 can include instructions that, when executed by processor 160, can facilitate performance of operations defining condition detecting component 122. As discussed with FIGS. 4-5 below, condition detecting component 122 can, in accordance with one or more embodiments, receive a request to implement a network service in a network that includes access point equipment connected via a transport segment to a core network segment. For example, one or more embodiments of network equipment 150 can receive a request from access point equipment 170 to implement a network service in a communications network with access point equipment 170 connected via a transport segment to a core network segment (not shown).

Further, in another example, in one or more embodiments, computer executable components 120 can include instructions that, when executed by processor 160, can facilitate performance of operations defining location selecting component 124. As discussed with FIGS. 3-4 below, location selecting component 124 can, in accordance with one or more embodiments, based on the request to implement a network service, select deployment locations in the network for service elements to enable the network service. For example, in one or more embodiments, network equipment 150 can utilize location selecting component 124 to, based on the request from access point equipment 170, select deployment locations in the network for service elements to enable the network service.

In yet another example, computer executable components 120 can include instructions that, when executed by processor 160, can facilitate performance of operations defining deployment component 126. As discussed herein, deployment component 126 can facilitate deploying the service element at the selected deployment location. For example, in a circumstance where the service request includes a network multimedia service (e.g., discussed with FIG. 4 below), one or more embodiments of network equipment 150 can utilize deployment component 126 to facilitate deploying a service element at the selected deployment location.

Figure 2:
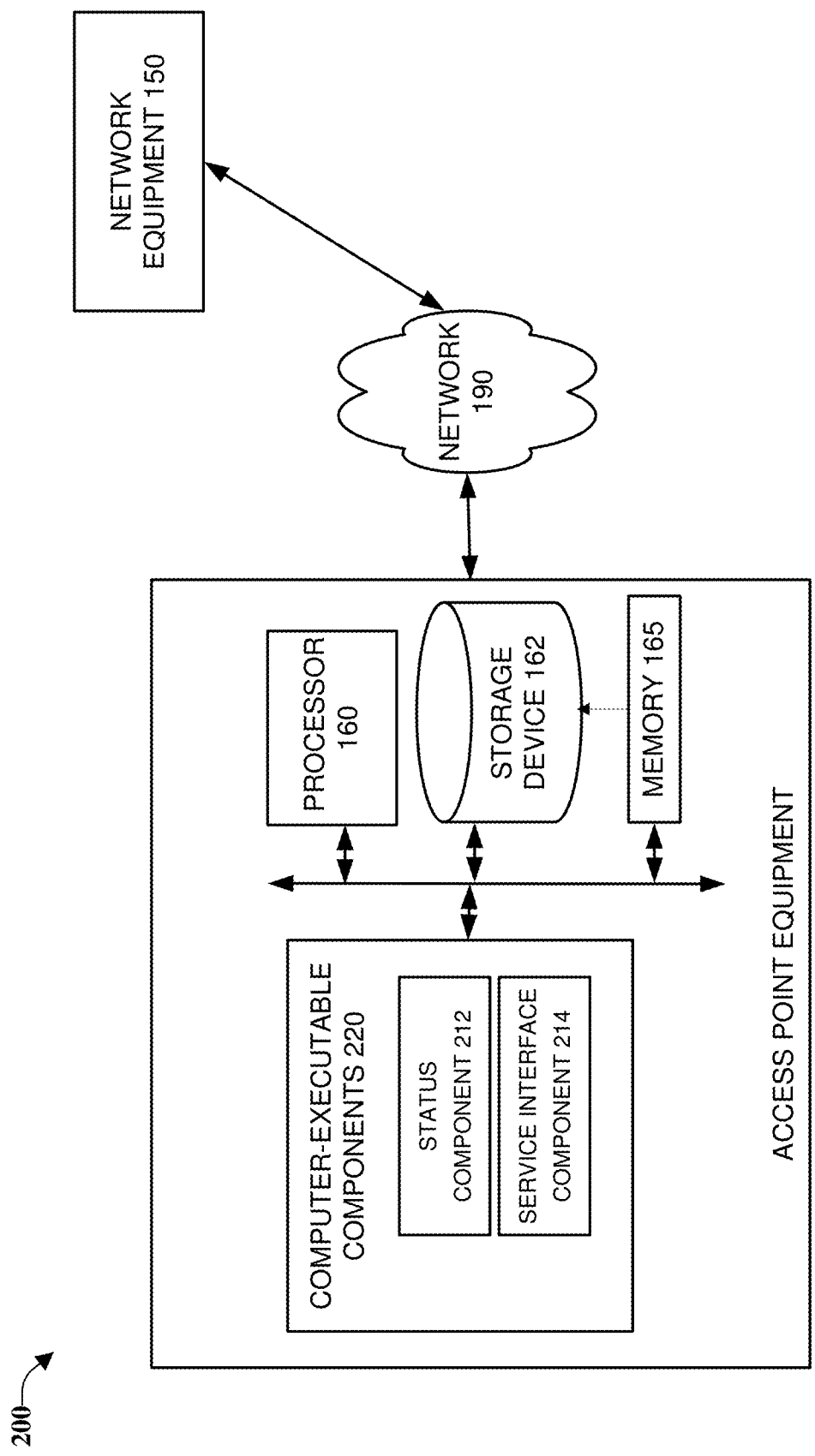
FIG. 2 is a diagram of a non-limiting example system that can facilitate, in response to feature activation at an access point, planning and deploying service elements of a network service across transport and core network segments, in accordance with one or more embodiments.

FIG. 2 is a diagram of a non-limiting example system 200 that can facilitate, in response to feature activation at an access point, planning and deploying service elements of a network service across transport and core network segments, in accordance with one or more embodiments. For purposes of brevity, description of like elements and/or processes employed in other embodiments is omitted. As discussed further below, system 200 can include access point equipment 170 connected to network equipment 150 via network 190.

As depicted, access point equipment 170 can include computer executable components 220, processor 260, storage device 262, and memory 265 which can perform functions similar to computer executable components 120, processor 160, storage device 162, and memory 165 described with FIG. 1 above. Particularly, memory 265 that can store one or more computer and/or machine readable, writable, and/or executable components and/or instructions 220 that, when respectively executed by processor 260, can facilitate performance of operations defined by the executable component(s) and/or instruction(s).

Generally, applications (e.g., computer executable components 220) can include routines, programs, components, data structures, etc., that perform particular tasks or implement particular abstract data types. In system 200, computer executable components 220 can include status component 212, service interface component 214, and other components described or suggested by different embodiments described herein that can improve the operation of system 200. It should be appreciated that these components, as well as aspects of the embodiments of the subject disclosure depicted in this figure and various figures disclosed herein, are for illustration only, and as such, the architecture of such embodiments are not limited to the systems, devices, and/or components depicted therein. For example, in some embodiments, access point equipment 170 can further comprise various computer and/or computing-based elements described herein with reference to mobile handset 900 of FIG. 9 and operating environment 1000 described with FIG. 10.

In an example, in one or more embodiments, computer executable components 220 can be used in connection with implementing one or more of the systems, devices, components, and/or computer-implemented operations shown and described in connection with FIG. 2 or other figures disclosed herein. For example, in one or more embodiments, computer executable components 220 can include instructions that, when executed by processor 260, can facilitate performance of operations defining status component 212. As discussed with FIGS. 4-5 below, in one or more embodiments, status component 212 can communicate a request to a logical service system to implement a logical service in a communications network, with the access point equipment being connected by a transport section of the communications network to a core section of the communications network.

For example, in one or more embodiments, access point equipment 170 can utilize status component 212 to communicate a request to a network equipment 150, where computer executable components 120 can implement a logical service system, e.g., via condition detecting component 122, location selecting component 124, and deployment component 126. Further, as described with FIGS. 4-5 below, access point equipment 170 can be connected by a transport section of a network to a core section of the communications network.

In another example, in one or more embodiments, computer executable components 220 can include instructions that, when executed by processor 160, can facilitate performance of operations defining, service interface component 214. As discussed with FIGS. 4-5 below, service interface component 214 can, in accordance with one or more embodiments, receive, from the logical service system, an indication that the logical service is available for use, with the logical service being instantiated by logical service elements deployed at transport equipment comprised in the transport section, and core equipment comprised in the core section, and with the transport equipment and the core equipment were selected by the logical service system based on a requirement of the logical service. For example, in one or more embodiments, access point equipment 170 can receive via service interface component 214, from network equipment 150, an indication that the multimedia service is available for use. In this example, the multimedia service can have been instantiated by logical service elements deployed at transport equipment selected by deployment component 126. Example logical service elements for different example network services are discussed below with FIG. 4 (e.g., a multimedia delivery service), and FIG. 5 (e.g., a control plane service).

Figure 3:
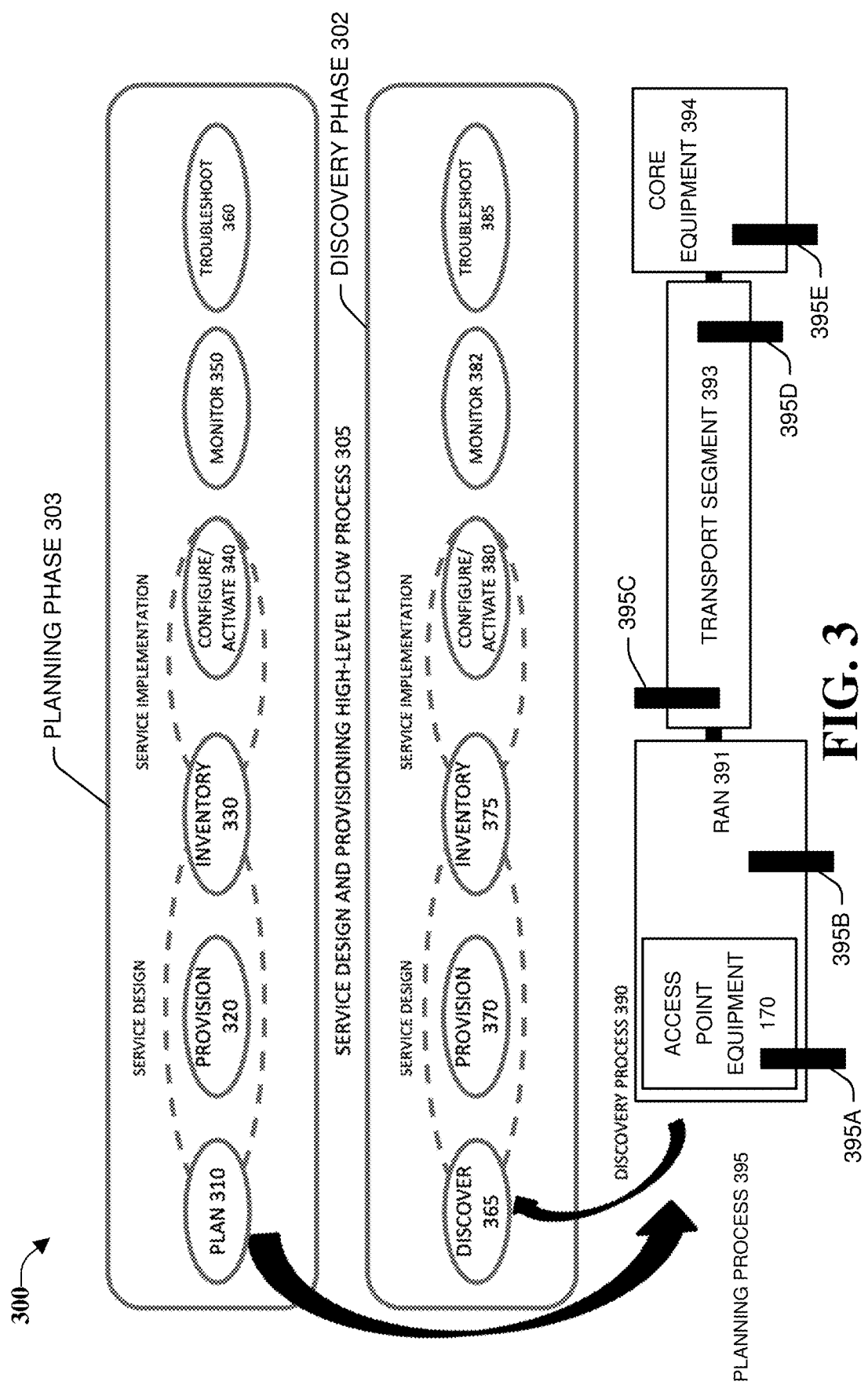
FIG. 3 is a diagram of a non-limiting example system that can facilitate, in response to feature activation at an access point, planning and deploying service elements of a network service across transport and core network segments.

FIG. 3 is a diagram of a non-limiting example system 300 that can facilitate, in response to feature activation at an access point, planning and deploying service elements of a network service across transport and core network segments, in accordance with one or more embodiments. For purposes of brevity, description of like elements and/or processes employed in other embodiments is omitted.

As depicted, in accordance with one or more embodiments, system 300 shows two phases of design and implementation of network services a communications network, e.g., discovery phase 302 and planning phase 303 for a communication network that includes RAN 391 with access point equipment 170, transport segment 393, and core equipment 394. The diagram further illustrates a network service slice with allocated resources 395A-E overlayed on existing network parts noted above. Discovery phase 302 includes discover 365, inventory 375, monitor 382, and troubleshoot 385, and planning phase 303 includes plan 310, inventory 330, monitor 350, and troubleshoot 360, in accordance with one or more embodiments. For discovery phase 302 and planning phase 303, a service design activity includes provision 320 and 370, and a service implementation activity includes configure/activate 340 and 380, respectively.

One or more embodiments can work within a cloud platform environment to coordinate the planning and deployment of network services across multiple domains (e.g., segments or parts) of a communications network, e.g., the RAN segment connected to network core equipment via a transport segment. One approach to planning and deploying can utilize network slices to utilize existing network resources, e.g., can overlay network services (e.g., logical services).

Using different approaches, one or more embodiments can facilitate the abstraction of network services into network slices managed by the provider of the network. In one or more embodiments, a network slice can describe a virtual network with independent sets of logical network functions that can be selected to support particular requirements of different network services, e.g., allocated resources 395A-E. One or more embodiments can request allocation of a network slice having certain characteristics selected to facilitate successful program execution. Example characteristics of network slices can include, but are not limited to, location, speed, connectivity, latency, security, energy use, coverage, and capacity.

In an example implementation, a virtual network function for a network service can be deployed by using an existing instance of the virtual network function at a selected deployment location. In another example, when an existing instance of a virtual network function is not available, one or more embodiments can instantiate the virtual network function at a deployment location. As described herein, network services can be implemented by service elements linked across different network elements, e.g., allocated resources 395A-E linked into a network slice.

Returning to the example depicted, in one or more embodiments, in discovery phase 302, discovery process 390 can be used to gather current information about different segments of the communication network, e.g., by linked processes including, but not limited to, inventory 375, monitor 382, and troubleshoot 385.

With inventory 375 process, an inventory record of the service design can be stored. It should be noted that, for example network services described herein, to plan implementation of the function across the different segments, a network active inventory and the logical/infrastructure connectivity of the network can be used to determine where and how different network service elements are deployed and linked. Once gathered, this information can be used in planning phase 303, by linked processes including, but not limited to, plan 310, inventory 330, monitor 350, and troubleshoot 360, in accordance with one or more embodiments.

Figure 4:
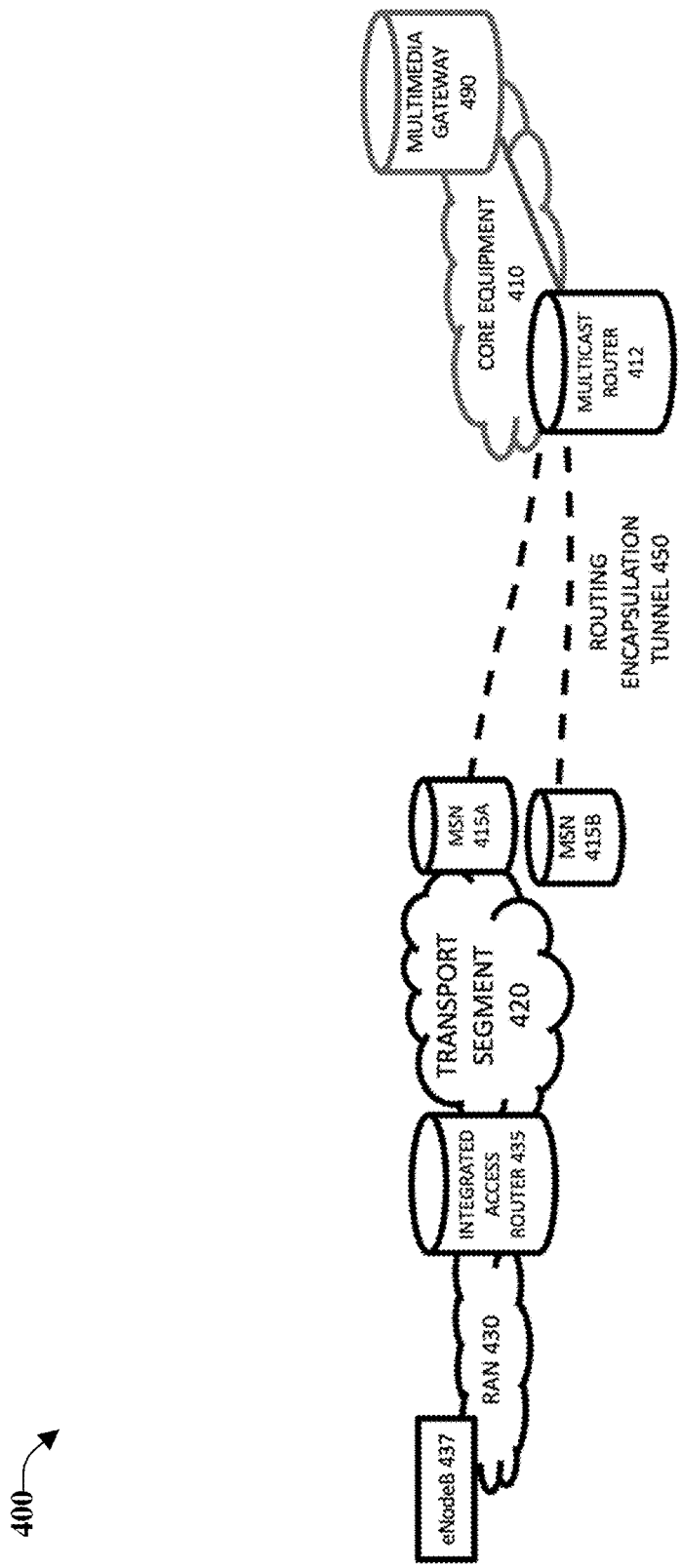
FIG. 4 depicts a diagram of a non-limiting example system that can facilitate, in response to feature activation at an access point, planning and deploying service elements of a network service across transport and core network segments.

FIG. 4 depicts a diagram of a non-limiting example system 400 that can facilitate, in response to feature activation at an access point, planning and deploying service elements of a network service across transport and core network segments, in accordance with one or more embodiments. For purposes of brevity, description of like elements and/or processes employed in other embodiments is omitted.

An example network service that can be implemented using one or more embodiments described herein is a broadcast/multicast multimedia service capability. In some implementations, this service can be comprised of linked network service elements spanning multiple broad network segments, e.g., mobility RAN 430, access point equipment 170 (e.g., via an eNodeB 437), transport segment 420, and core equipment 410, with a combination of multiple physical and virtual network functions being used to implement the service.

In this example, the feature activation of access point equipment 170 can be activation of a multimedia coordination function by eNodeB 437, and condition detecting component 122 of network equipment 150 can be configured to operate as a notification listener to receive network element notifications, e.g., from a cloud service provider. Based on the function activation, in an example implementation, at core equipment 410, multimedia gateway 490 can be implemented for functions such as session management and traffic routing, with a multicast router 412 to provide overlay connectivity to transport segment 420 where the data flows in and out the RAN 430. In this example, to facilitate connectivity between core equipment 410 and transport segment 420, one or more embodiments can plan and implement a routing encapsulation tunnel 450 to support the multi-cast/uni-cast traffic flow.

One or more embodiments can plan and implement complex combinations of service elements, e.g., including, but not limited to, multimedia gateway 490, multicast router 412, routing encapsulation tunnel 450, multiservice nodes (MSN) 415A-V, and integrated access router 435.

Figure 5:
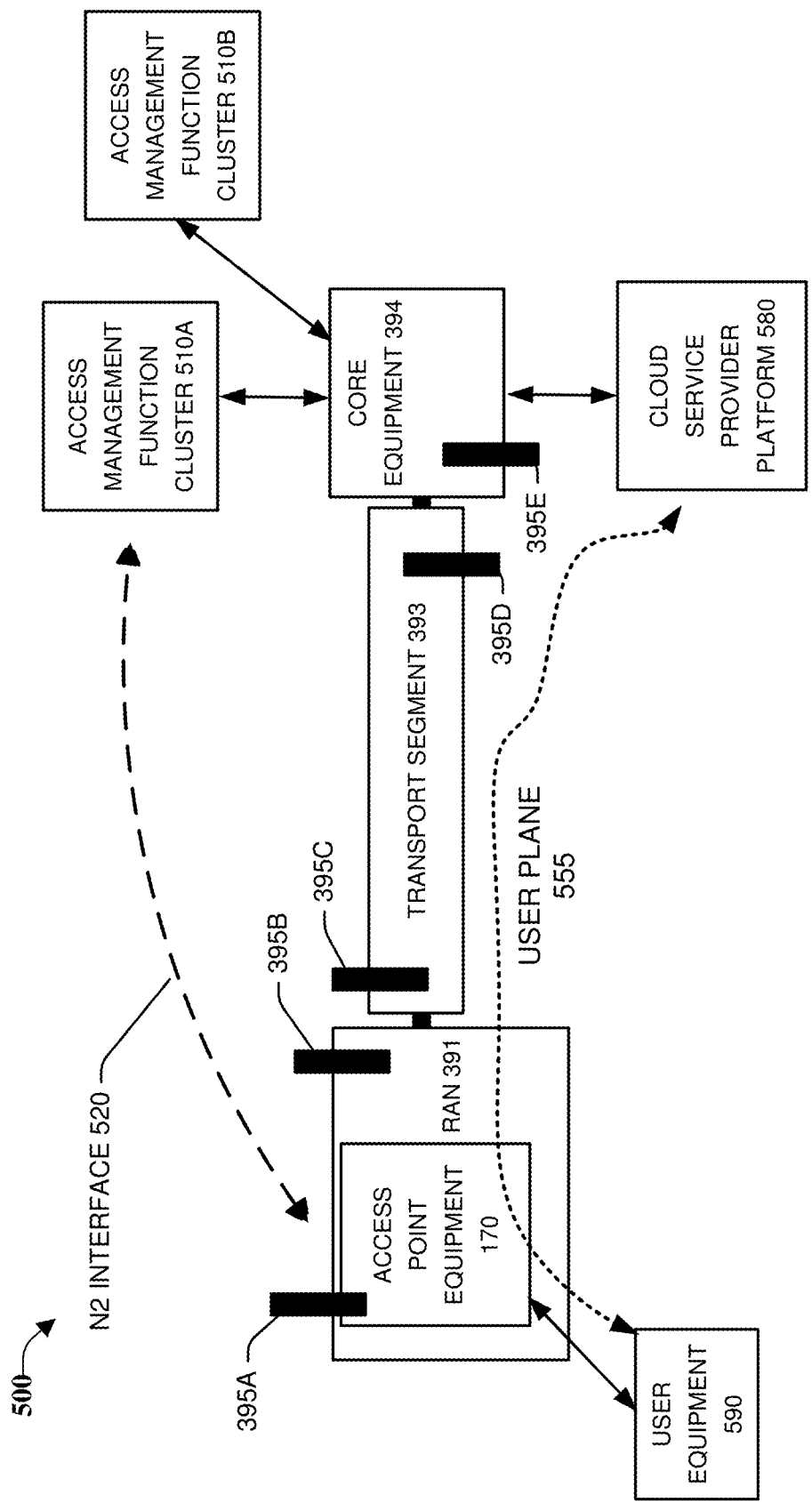
FIG. 5 is a diagram of a non-limiting example system that can illustrate non-limiting examples of network services that can be planned and implemented by one or more embodiments. For purposes of brevity, description of like elements and/or processes employed in other embodiments is omitted.

FIG. 5 is a diagram of a non-limiting example system 500 that can illustrate non-limiting examples of network services that can be planned and implemented by one or more embodiments. For purposes of brevity, description of like elements and/or processes employed in other embodiments is omitted.

Depicted in FIG. 5, RAN 391 includes access point equipment 170, transport segment 393, and core equipment 394, and can be used to describe additional network services that can be deployed by one or more embodiments. As also depicted, access management function clusters 510A-B are communicatively coupled to core equipment 394 and access management function clusters 510A was logically coupled via an example N2 interface 495 to access point equipment 170.

Another example network service that can be implemented by one or more embodiments is a service to connect access point equipment 170 to a control plane, e.g., establishing and maintaining an N2 interface 520 connection between access point equipment 170 (e.g., eNodeB 437) to at least one of access management function clusters 510A-B for control plane resource allocation. It should be appreciated that, although this example concerns the N2 interface of fifth generation network technologies, other similar services can be implemented with aspects of embodiments discussed herein, e.g., including, but not limited to, other types of coordinated interface between edge network elements and central network elements.

As discussed above, embodiments can be triggered, in accordance with one or more embodiments, by condition detecting component 122 detecting a request (or any other indication) to implement a network service by other network equipment. In this example, a function request can include access point equipment 170 requesting access management function information.

Based on the request (e.g., function activation), in discovery phase 302, network equipment 150 can use discovery process 390 to discover access management function clusters 510A-B as sources of access management function information. Once discovered, at planning phase 303, embodiments can evaluate (e.g., via location selecting component 124) different access management function clusters 510A-B as potential sources of access management function information, e.g., by receiving and evaluating different control plane configurations of access management function clusters 510A-B.

In an approach to evaluation that can be used to evaluate access management function clusters 510A-B, a service design workflow can be generated to evaluate access management function clusters 510A-B. Criteria that can be used for evaluation include the physical distances of paths from access point equipment 170 to access management function clusters 510A-B, with an advantageous cluster having the shortest distance of access management function clusters 510A-B. Once selected, deployment component 126 can configure access point equipment 170 to access the management functions from one or more access management function clusters 510A-B.

Another example network service that can be implemented by one or more embodiments is a user plane function service to establish user plane function 555 between cloud service provider platform 580 and user equipment 590. It should be appreciated that, although this example concerns a user plane function that is an element of fifth generation network technologies, other similar services can be implemented with aspects of embodiments discussed herein, e.g., including, but not limited to, other types of virtual private network connections between core network equipment and customer equipment.

In an example implementation, one or more embodiments can use a network slice that includes network resources 395A-E to enable user plane function 555 across the depicted network segments. In one or more embodiments, different functions of network equipment 150 can be a part of network operational support systems, and for certain types of customers, before instantiation of user plane 555, network business support systems can be queried to verify the order from the customer, e.g., by validating network the slice service contract for resources 395A-E, for the cloud service provider of cloud service provider platform 580.

As discussed above, embodiments can be triggered, in accordance with one or more embodiments, by condition detecting component 122 detecting a request (or any other indication) to implement a network service by other network equipment. In this example, a function request can include access point equipment 170 requesting establishment of user plane 555 via a user plane management function service for a connection between cloud service provider platform 580 and user equipment 590. Example sources of this request include cloud service provider compute hosts or other elements that can utilize user plane communications.

Based on the request (e.g., function activation), in discovery phase 302, network equipment 150 can use discovery process 390 to evaluate an inventory view of the resources and locations of resources of RAN 391, transport segment 393, and core equipment 394. Example resources can include parts of the virtual machine-based architecture of cloud service provider platform 580 and cloud service provider compute hosts (not depicted).

Once discovered, at planning phase 303, embodiments can evaluate (e.g., via location selecting component 124) discovered elements of the system. In an approach to evaluation that can be used to evaluate access management function clusters 510A-B, a service design workflow can be generated to evaluate different resources to be used by user plane 555, and once selected, deployment component 126 can configure these resources to provide the network service.

Figure 6:
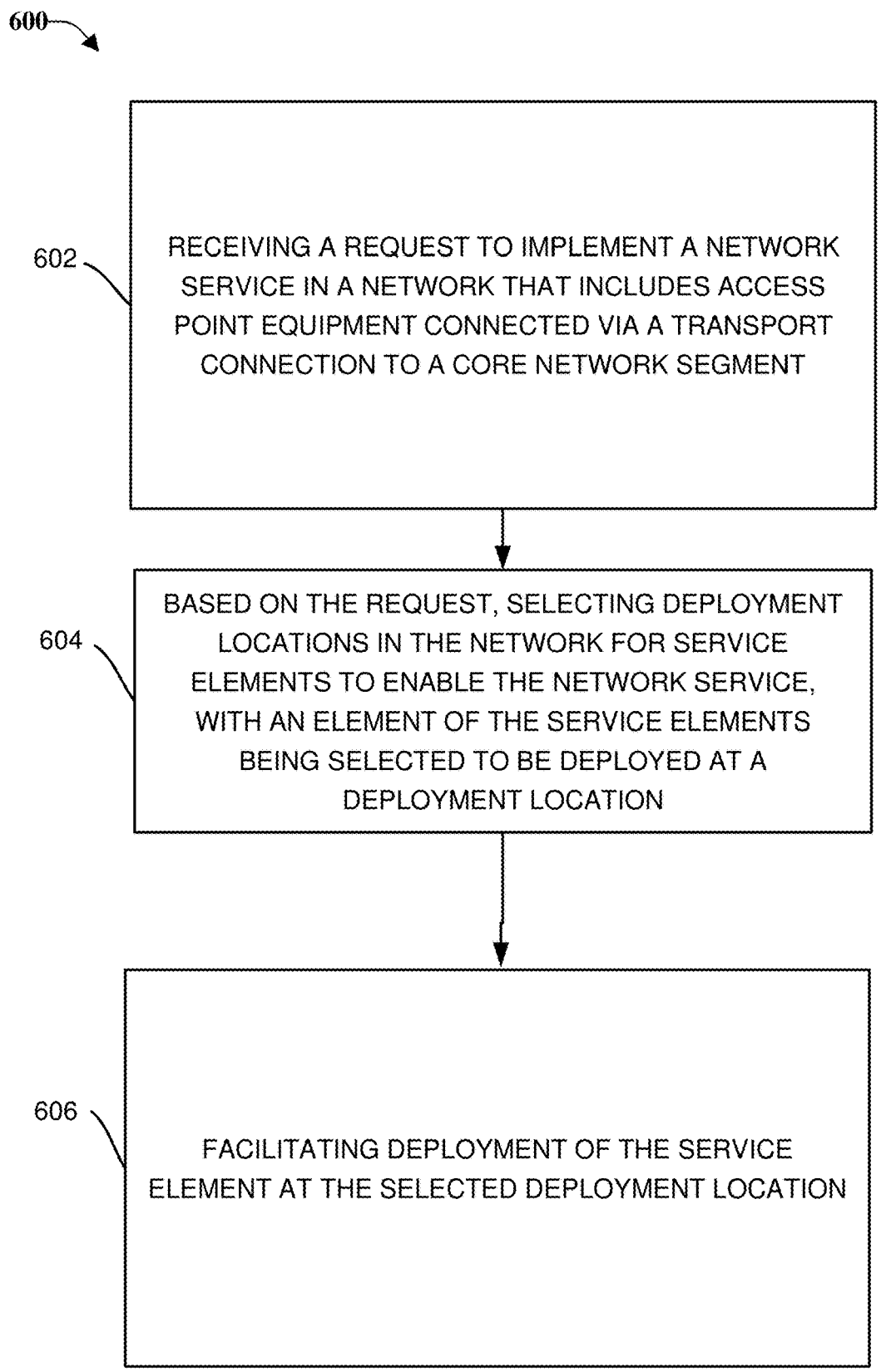
FIG. 6 illustrates an example method that can facilitate, in response to feature activation at an access point, planning and deploying service elements of a network service across transport and core network segments.

FIG. 6 illustrates an example method 600 that can facilitate, in response to feature activation at an access point, planning and deploying service elements of a network service across transport and core network segments, in accordance with one or more embodiments. For purposes of brevity, description of like elements and/or processes employed in other embodiments is omitted.

At 602, method 600 can include receiving a request to implement a network service in a network that includes access point equipment connected via a transport segment to a core network segment. For example, in one or more embodiments, a method can include receiving a request to implement a multimedia service (e.g., from multimedia gateway 490 of FIG. 4) in a network that includes access point equipment 170 connected via transport segment 420 to a core network segment (e.g., to core equipment 410).

At 604, method 600 can include, based on the request, selecting deployment locations in the network for service elements to enable the network service, with an element of the service elements being selected to be deployed at a deployment location. For example, one or more embodiments can, based on the request, select deployment locations (e.g., MSNs 415A-B, integrated access router 435) in the network for service elements to enable the network service, with an element of the service elements being selected to be deployed at a deployment location.

At 606, method 600 can include facilitate deploying the service element at the selected deployment location. For example, in one or more embodiments, facilitate deploying the service element at the selected deployment location, e.g., selected via location selecting component 124.

Figure 7:
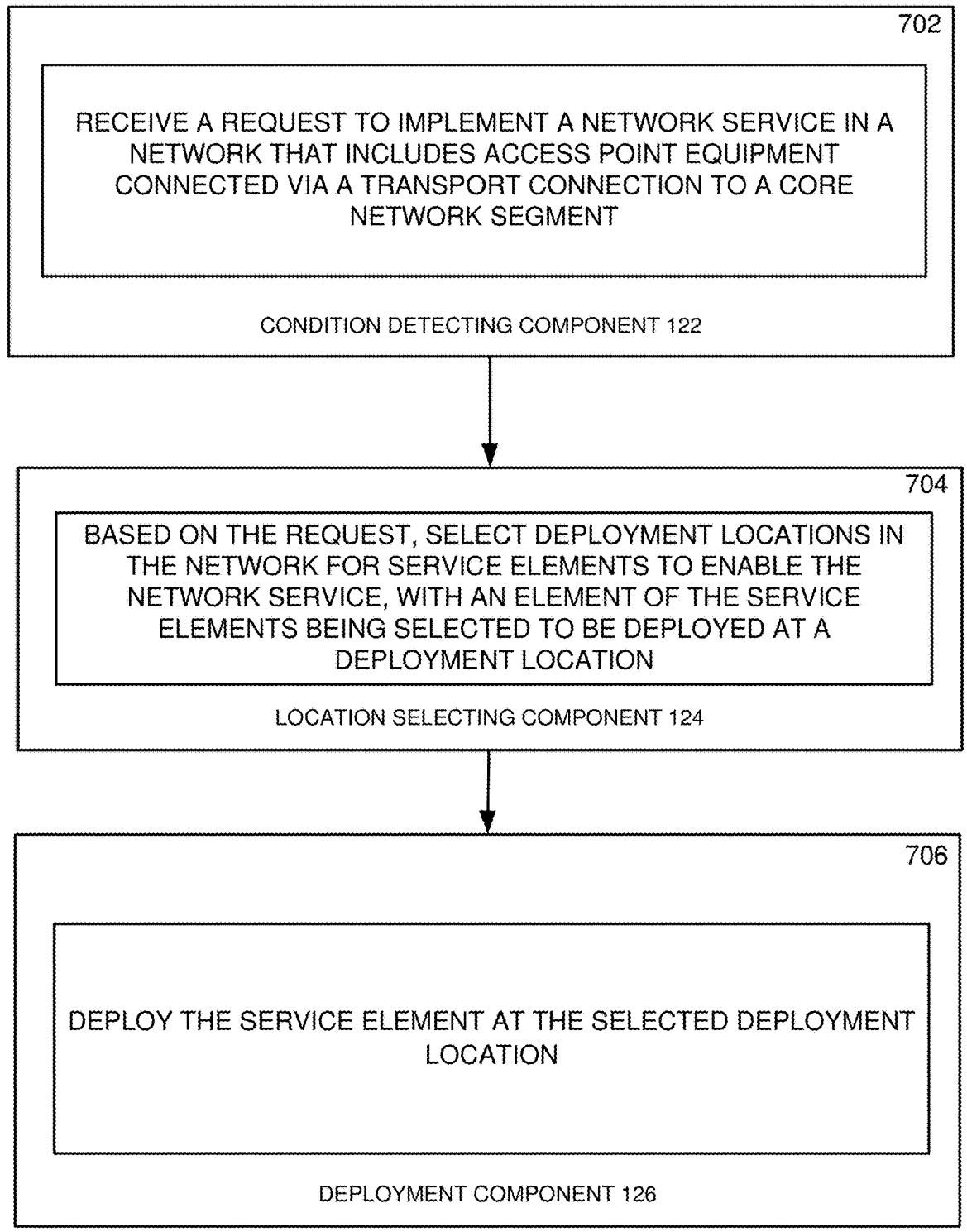
FIG. 7 depicts a system that can facilitate, in response to feature activation at an access point, planning and deploying service elements of a network service across transport and core network segments.

FIG. 7 depicts a system 700 that can facilitate, in response to feature activation at an access point, planning and deploying service elements of a network service across transport and core network segments, in accordance with one or more embodiments. For purposes of brevity, description of like elements and/or processes employed in other embodiments is omitted. As depicted, system 700 can include condition detecting component 122, location selecting component 124, deployment component 126, and other components described or suggested by different embodiments described herein, that can improve the operation of system 700.

In an example, component 702 can include the functions of condition detecting component 122, supported by the other layers of system 700. For example, component 702 can receive a request to implement a network service in a network that includes access point equipment connected via a transport segment to a core network segment. For example, one or more embodiments condition detecting component 122 can receive a request to implement a network service in a network that includes access point equipment 170 connected via a transport segment to a core equipment 410.

In this and other examples, component 704 can include the functions of location selecting component 124, supported by the other layers of system 700. Continuing this example, in one or more embodiments, component 704 can, based on the request, can select deployment locations in the network for service elements to enable the network service, with an element of the service elements being selected to be deployed at a deployment location. For example, one or more embodiments can, based on the request, location selecting component 124 can select deployment locations in the network for service elements to enable the network service.

In an example, component 706 can include the functions of deployment component 126, supported by the other layers of system 700. For example, component 706 can facilitate deploying the service element at the selected deployment location. For example, in one or more embodiments, deployment component 126 of network equipment 150 can facilitate deploying the service element at the selected deployment location.

Figure 8:
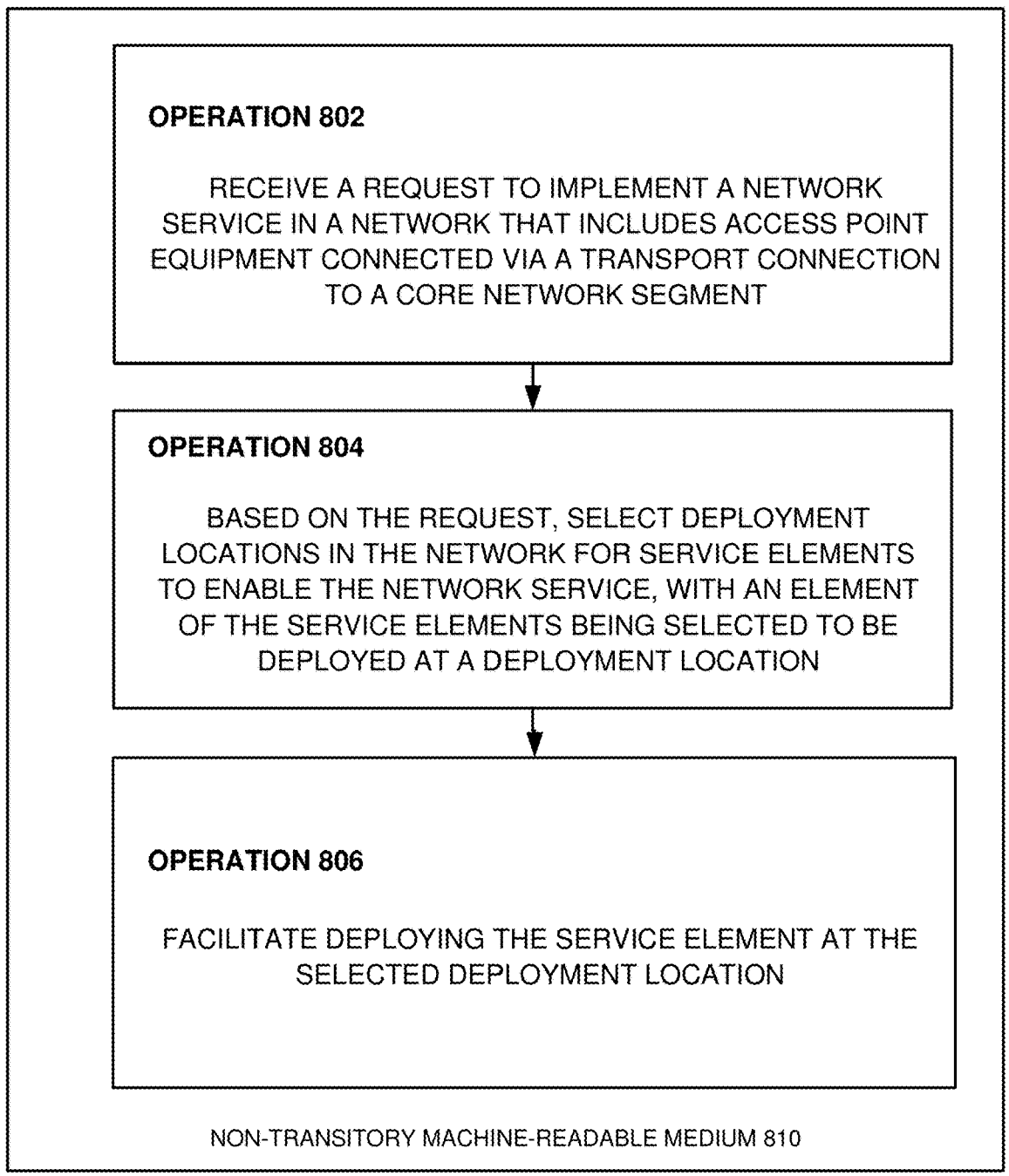
FIG. 8 depicts an example non-transitory machine-readable medium that can include executable instructions that, when executed by a processor of a system, facilitate, in response to feature activation at an access point, planning and deploying service elements of a network service across transport and core network segments.

FIG. 8 depicts an example 800 non-transitory machine-readable medium 810 that can include executable instructions that, when executed by a processor of a system, facilitate, in response to feature activation at an access point, planning and deploying service elements of a network service across transport and core network segments, in accordance with one or more embodiments described above. For purposes of brevity, description of like elements and/or processes employed in other embodiments is omitted. As depicted, non-transitory machine-readable medium 810 includes executable instructions that can facilitate performance of operations 802-808.

In one or more embodiments, the operations can include operation 802 that can receive a request to implement a network service in a network that includes access point equipment connected via a transport segment to a core network segment. For example, one or more embodiments an operation can receive a request to implement a network service in a network that includes access point equipment 170 connected via a transport segment to a core equipment 410.

In one or more embodiments, the operations can include operation 804 that can, based on the request, can select deployment locations in the network for service elements to enable the network service, with an element of the service elements being selected to be deployed at a deployment location. For example, one or more embodiments can, based on the request, location selecting component 124 can select deployment locations in the network for service elements to enable the network service. In an additional example, component 806 can facilitate deploying the service element at the selected deployment location.

Figure 9:
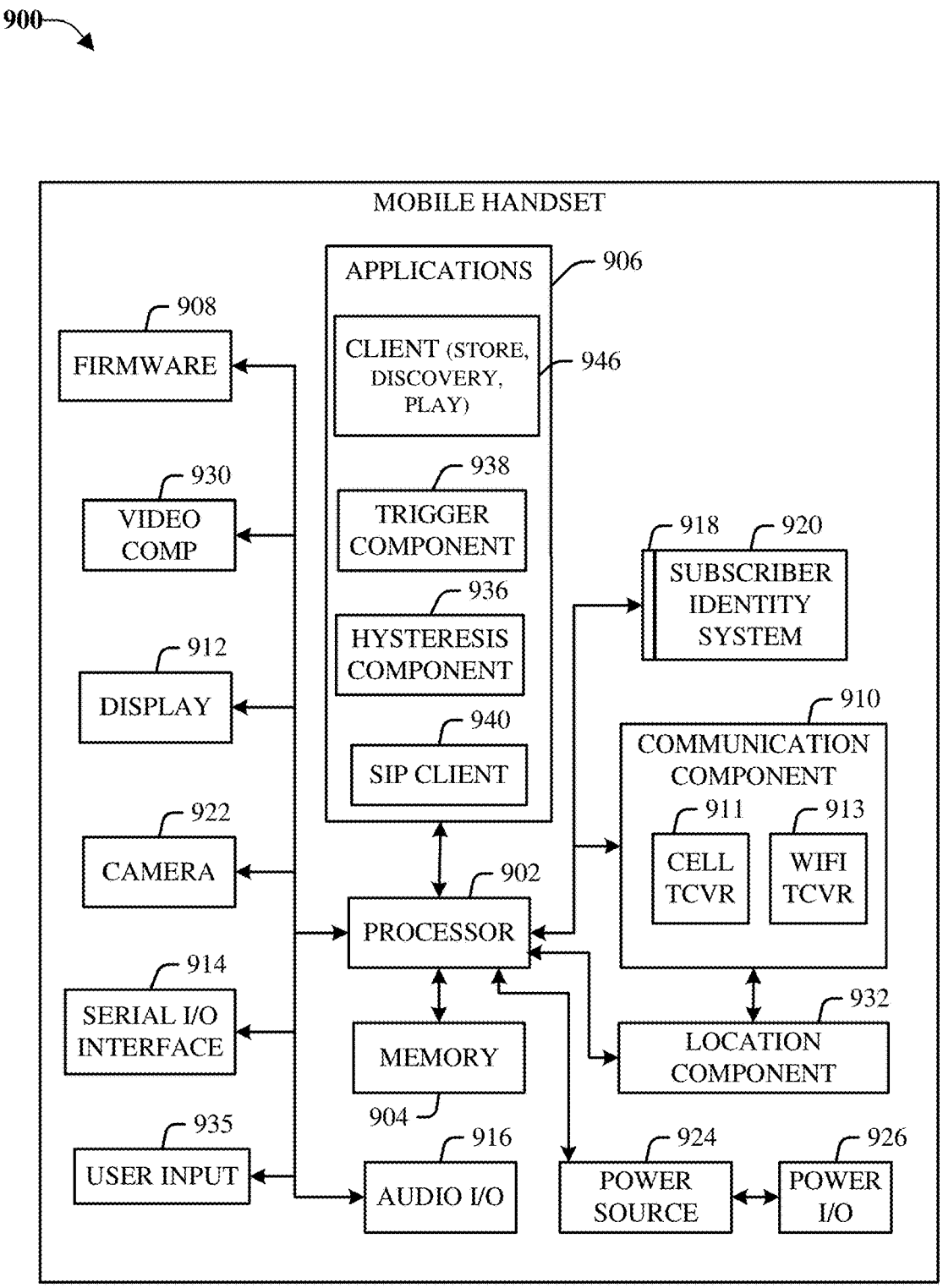
FIG. 9 illustrates an example block diagram of an example mobile handset operable to engage in a system architecture that can facilitate processes described herein, in accordance with one or more embodiments.

FIG. 9 illustrates an example block diagram of an example mobile handset 900 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media The handset includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1294) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card SIM or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communications component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or a decoded format.

A video processing component 922 (e.g., a camera) can be provided for decoding encoded multimedia content. The video processing component 922 can aid in facilitating the generation, editing, and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal.

The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 936 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Network 190 can employ various cellular systems, technologies, and modulation schemes to facilitate wireless radio communications between devices. While example embodiments include use of 5G new radio (NR) systems, one or more embodiments discussed herein can be applicable to any radio access technology (RAT) or multi-RAT system, including where user equipment operate using multiple carriers, e.g., LTE FDD/TDD, GSM/GERAN, CDMA2000, etc. For example, wireless communication system 200 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the user equipment. The term carrier aggregation (CA) is also called (e.g., interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

Various embodiments described herein can be configured to provide and employ 5G wireless networking features and functionalities. With 5G networks that may use waveforms that split the bandwidth into several sub bands, different types of services can be accommodated in different sub bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Figure 10:
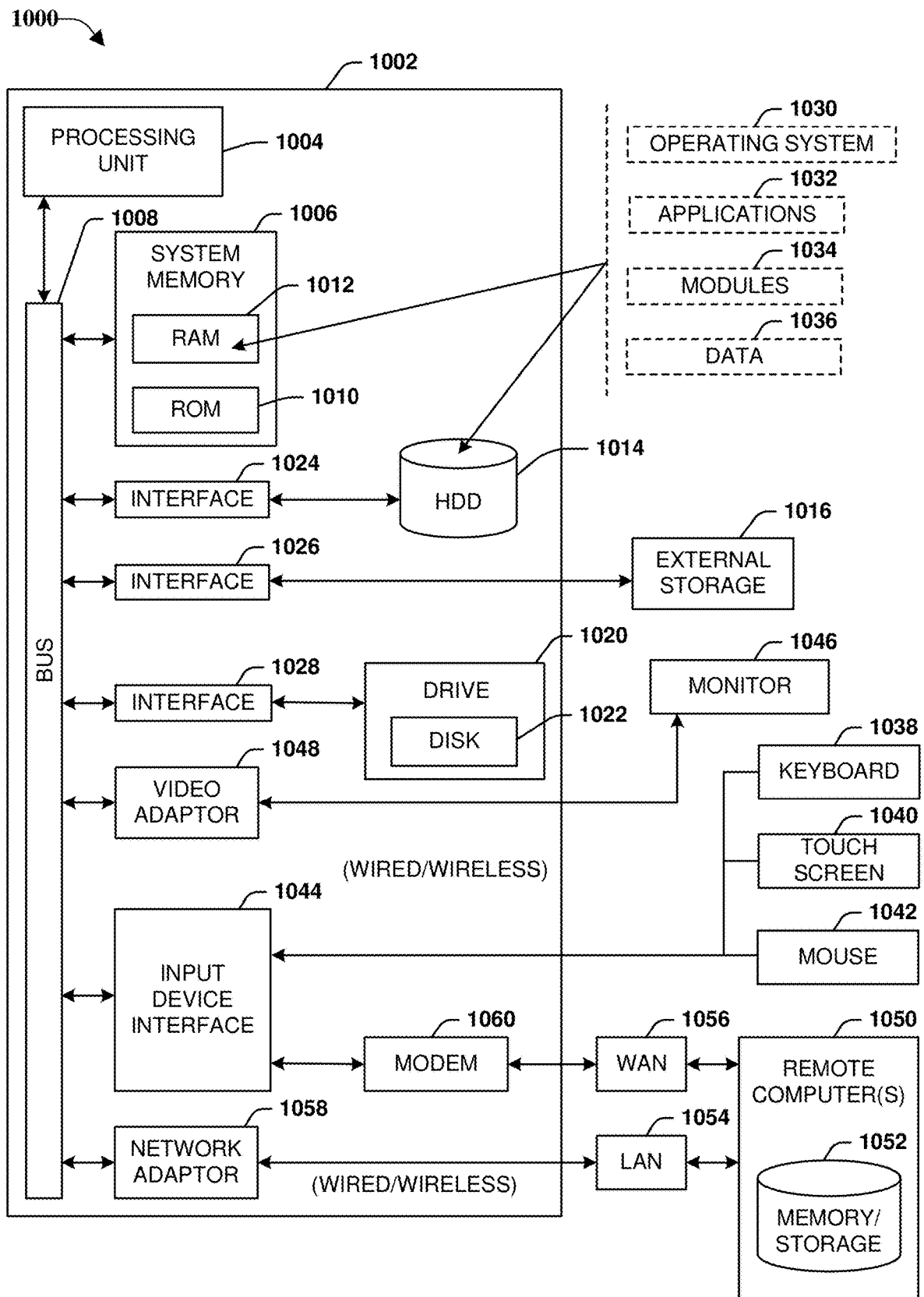
FIG. 10 illustrates an example block diagram of an example computer operable to engage in a system architecture that can facilitate processes described herein, in accordance with one or more embodiments.

FIG. 10 provides additional context for various embodiments described herein, intended to provide a brief, general description of a suitable operating environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example operating environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and a drive 1020, e.g., such as a solid-state drive, an optical disk drive, which can read or write from a disk 1022, such as a CD-ROM disc, a DVD, a BD, etc. Alternatively, where a solid-state drive is involved, disk 1022 would not be included, unless separate. While the internal HDD 1014 is illustrated as located within the computer 1002, the internal HDD 1014 can also be configured for external use in a suitable chassis (not shown). Additionally, while not shown in environment 1000, a solid-state drive (SSD) could be used in addition to, or in place of, an HDD 1014. The HDD 1014, external storage device(s) 1016 and drive 1020 can be connected to the system bus 1008 by an HDD interface 1024, an external storage interface 1026 and a drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above, such as but not limited to a network virtual machine providing one or more aspects of storage or processing of information. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

Further to the description above, as it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine-readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. User equipment do not normally connect directly to the core networks of a large service provider, but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g., call transfer) or implicitly (e.g., call waiting). It is to be noted that service "execution" may or may not be a core network functionality as third-party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) RAN 430 (RAN) or GERAN; Terrestrial RAN 430 (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used, or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be affected across a plurality of devices. Accordingly, the embodiments are not to be limited to any single implementation, but rather are to be construed in breadth, spirit and scope in accordance with the appended claims.

What is claimed is:

1. A method comprising:
   receiving, by network equipment comprising a processor, a request to implement a network service in a network, wherein the network comprises access point equipment connected via a transport segment to a core network segment;
   based on the request, selecting, by the network equipment, deployment locations in the network for service elements applicable to enabling the network service, wherein a first service element of the service elements is selected to be deployed at a deployment location; and
   facilitating, by the network equipment, deploying the first service element at the deployment location,
   wherein the first service element is deployed via a multicast coordination function instantiated at the access point equipment,
   wherein the network service includes a multicast multimedia service that includes linked network service elements spanning a radio access network, the access point equipment, the transport segment, and the core network segment, the linked network service elements being included in the service elements, and
   wherein based on an activation of the multicast coordination function, a multimedia gateway of the core network segment provides functions of session management and traffic routing, and a multicast router of the core network segment provides overlay connectivity to the transport segment where data flows in and out of the radio access network.

2. The method of claim 1, wherein the network service is implemented in a network service slice configured by the network equipment to utilize resources of the network.

3. The method of claim 1, wherein selecting the deployment location comprises evaluating the deployment locations based on requirements defined for the network service.

4. The method of claim 1, wherein the service elements further comprise a second service element to be deployed at transport equipment of the transport segment, and a third service element deployed at core equipment of the core network segment.

5. The method of claim 4, wherein the network service comprises an encryption tunnel from the core equipment to the access point equipment.

6. The method of claim 5, wherein the encryption tunnel comprises a routing encapsulation tunnel that facilitates multicast communications.

7. The method of claim 6, wherein the access point equipment couples to the transport segment via the second service element deployed using a multiservice node virtual network function instantiated at the transport equipment.

8. The method of claim 6, wherein the third service element is deployed via a multicast service virtual network function instantiated at the core equipment.

9. The method of claim 4, wherein the network service comprises a control plane connection from the core equipment to the access point equipment.

10. The method of claim 9, wherein the third service element is deployed via an access management virtual network function instantiated at the core equipment, and wherein the control plane connection comprises connections between the access point equipment and the access management virtual network function.

11. The method of claim 1, further comprising:
based on a first virtual network function that provides the first service element not being instantiated at the deployment location, facilitating, by the network equipment, instantiating the first virtual network function at the deployment location; and
configuring, by the network equipment, the first virtual network function to provide the first service element.

12. The method of claim 1, further comprising, based on a second virtual network function that provides the first service element already being instantiated at the deployment location, configuring, by the network equipment, the second virtual network function to provide the first service element.

13. The method of claim 1, wherein the access point equipment comprises wireless access point equipment, and wherein the network further comprises a radio access segment of the radio access network that provides a connection between a user equipment and the wireless access point equipment.

14. Access point equipment, comprising:
a processor; and
a memory that stores executable instructions that, when executed by the processor, facilitate the performance of operations, comprising:
communicating a request to a logical service system to implement a logical service in a communications network, wherein the access point equipment is connected by a transport section of the communications network to a core section of the communications network; and
receiving, from the logical service system, an indication that the logical service is available for use, wherein the logical service was instantiated by logical service elements deployed at transport equipment comprised in the transport section, and core equipment comprised in the core section, and wherein the transport equipment and the core equipment were selected by the logical service system based on a requirement of the logical service,
wherein communicating the request comprises using a multicast coordination function,
wherein the logical service includes a multicast multimedia service that includes linked logical service elements spanning a radio access network, the access point equipment, the transport section, and the core section, and
wherein based on an activation of the multicast coordination function, a multimedia gateway of the core equipment provides functions of session management and traffic routing, and a multicast router of the core equipment provides overlay connectivity to the transport section where data flows in and out of the radio access network.

15. The access point equipment of claim 14, wherein the logical service comprises an encapsulation tunnel that provides multicast communications from the core equipment to the access point equipment.

16. The access point equipment of claim 14, wherein the operations further comprise, determining to access an access management network function at the core equipment via a control plane connection to the core equipment, and wherein the logical service requested comprises the control plane connection.

17. A non-transitory machine-readable medium, comprising executable instructions that, when executed by a processor, facilitate performance of operations, comprising:
monitoring elements of a communications network for an indication that a node has enabled a feature of the communications network;
based on the indication and the feature, selecting a network service to provide the feature to the node;
evaluating, based on requirements determined to be applicable to the node, potential points in the communications network to deploy service functions to provide the feature, resulting in selected deployment points, wherein a first selected deployment point is comprised inside a core network of the communications network, and a second selected deployment point is comprised outside of the core network; and
deploying a service function of the service functions to a selected deployment point of the selected deployment points,
wherein the deploying of the service function to the selected deployment point includes deploying via a multicast coordination function instantiated at an access point equipment of a radio access network of the communications network,
wherein the network service includes a multicast multimedia service that includes linked service functions spanning the radio access network, a transport network of the communications network, and the core network, the linked service functions being included in the service functions, and
wherein based on an activation of the multicast coordination function, a multimedia gateway of the core network provides functions of session management and traffic routing, and a multicast router of the core network provides overlay connectivity to the transport network where data flows in and out of the radio access network.

18. The non-transitory machine-readable medium of claim 17, wherein the network service comprises a routing encapsulation tunnel from the node to a source of the multicast multimedia service.

19. The non-transitory machine-readable medium of claim 17, wherein the communications network comprises at least a fifth-generation communication network supporting new radio communication protocols, and wherein the feature comprises access, via a control plane message, to subscriber information from an access management function cluster.

20. The non-transitory machine-readable medium of claim 19, wherein the access management function cluster is selected from a plurality of access management function clusters based on the access management function cluster having a shortest physical distance to the access point equipment.

* * * * *